United States Patent [19]
Kirchner et al.

[11] Patent Number: 5,586,791
[45] Date of Patent: Dec. 24, 1996

[54] PUSH-FIT CONNECTOR FOR JOINING A FLUID LINE TO A PIPE

[75] Inventors: Hary Kirchner, Hanau; Ralf Hohmann; Ralf Spors, both of Bruchköbel, all of Germany

[73] Assignee: Rasmussen GmbH, Maintal, Germany

[21] Appl. No.: 514,694

[22] Filed: Aug. 14, 1995

[30] Foreign Application Priority Data

Aug. 19, 1994 [DE] Germany ............ 44 29 498.0

[51] Int. Cl.⁶ .................................................. F16L 43/02
[52] U.S. Cl. ...................... 285/179; 280/319; 280/330; 280/184
[58] Field of Search .................... 285/308, 319, 285/330, 184, 92, 179

[56] References Cited

U.S. PATENT DOCUMENTS

| | | | |
|---|---|---|---|
| 2,116,004 | 5/1938 | Tear | 285/184 X |
| 4,877,271 | 10/1989 | McCorkle | 285/92 X |
| 5,064,226 | 11/1991 | Klas | 285/184 |
| 5,269,566 | 12/1993 | Do et al. | 285/92 X |

FOREIGN PATENT DOCUMENTS 1413037  11/1975  United Kingdom ............ 285/184

Primary Examiner—Dave W. Arola
Attorney, Agent, or Firm—Darby & Darby

[57] ABSTRACT

A push-fit connector for joining a fluid line to a pipe. The pipe has a retaining rib, and the push-fit connector has an angled pipe section. One end section of the angled pipe section can be connected to the fluid line and the other end section can be fitted to the pipe in only one relative rotational position by using a pair of retaining arms which can engage with the retaining rib when the pipe and pipe section are fitted together. To join the pipe section and the pipe together in a torsion-resistant manner at different relative rotational positions, the pipe section is fitted in a locking manner to a coupling ring. The coupling ring has retaining arms to connect one coupling ring, together with the pipe section, to the pipe. The coupling ring and the pipe section are protected from relative rotation with respect to each other by teeth which can be mutually engaged at different rotational positions of the pipe section and coupling ring.

6 Claims, 2 Drawing Sheets

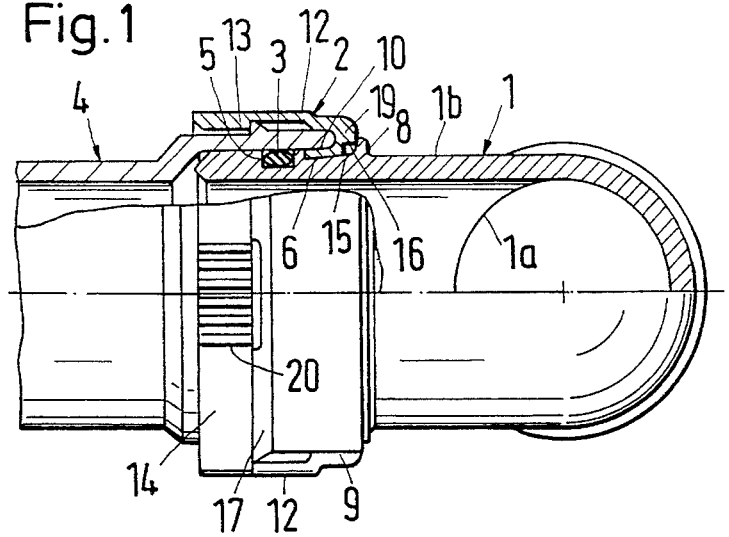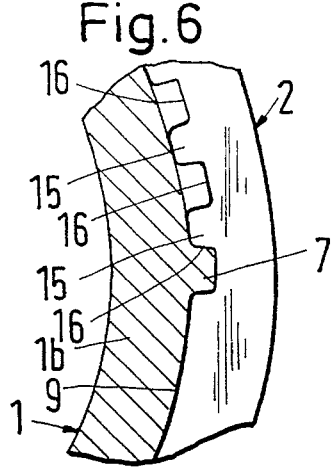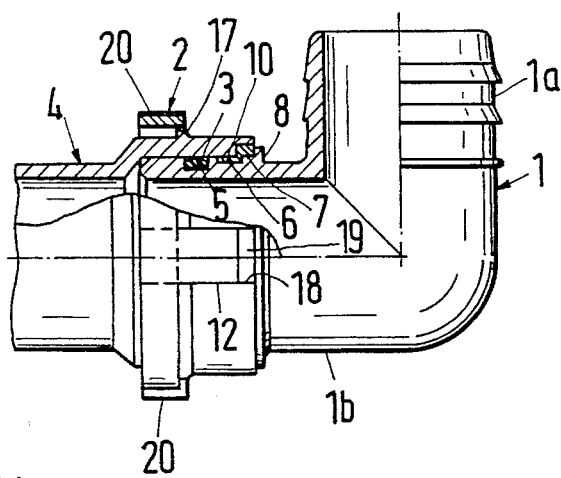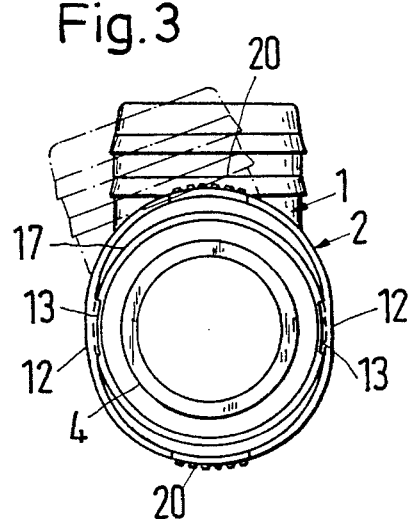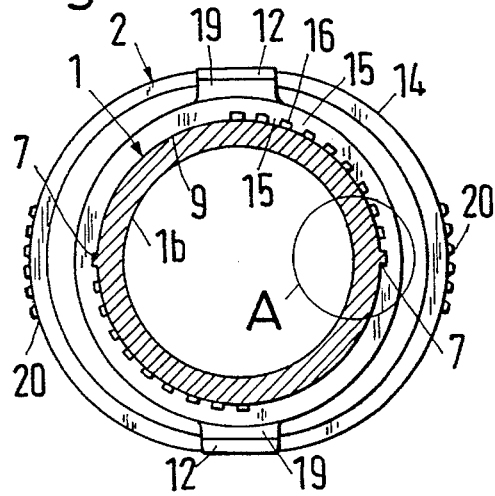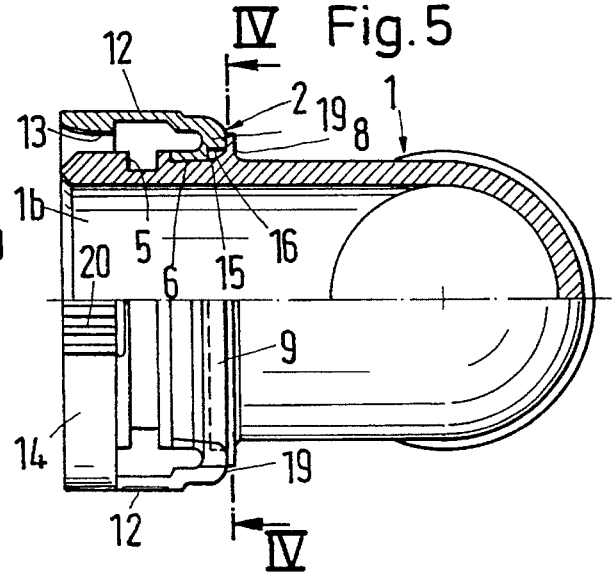

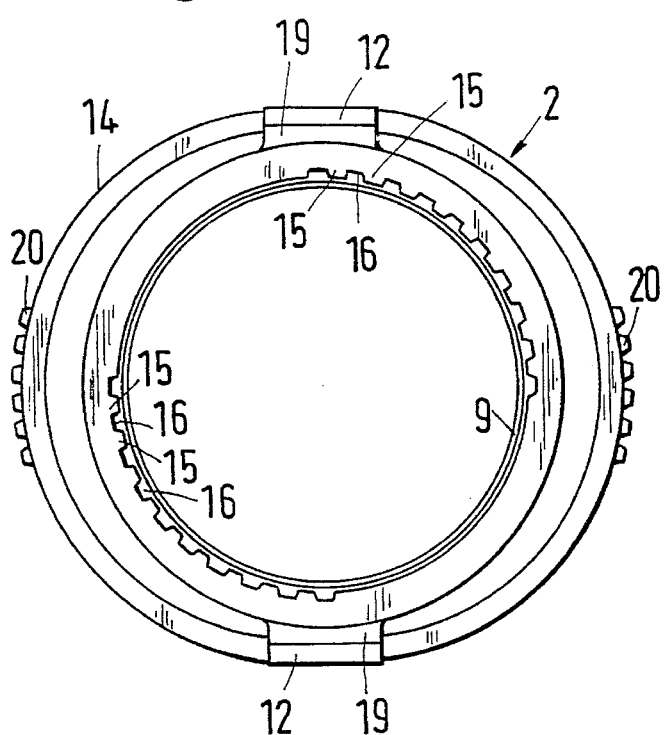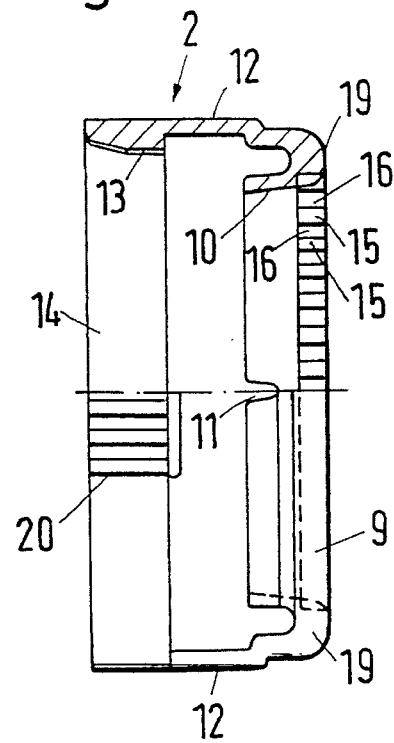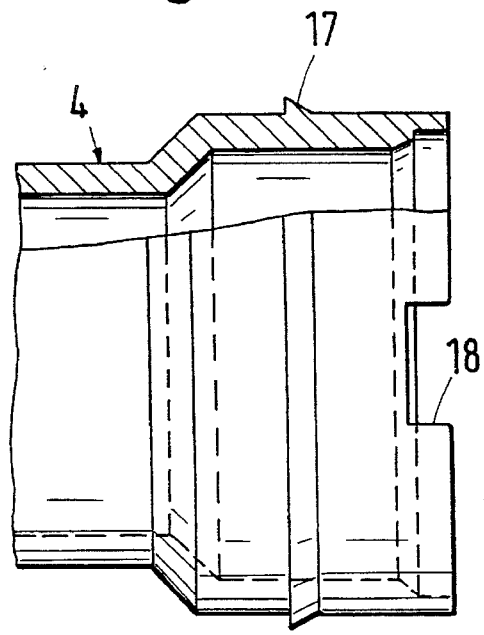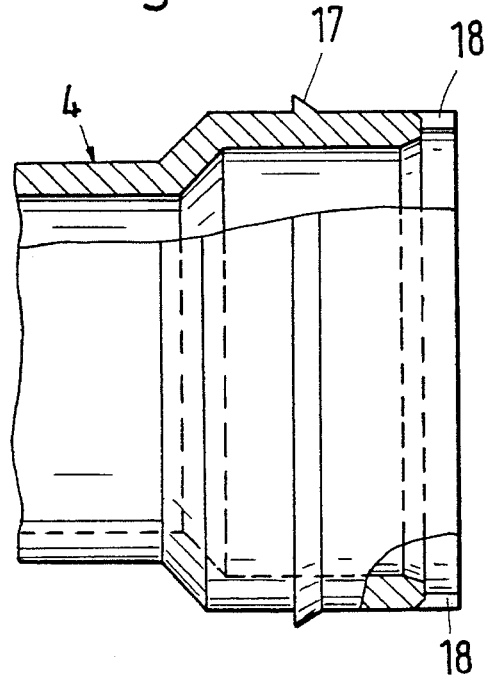

5,586,791

PUSH-FIT CONNECTOR FOR JOINING A FLUID LINE TO A PIPE

BACKGROUND OF THE INVENTION

1. Field of the Invention

The present invention relates to a push-fit connector for joining a fluid line to a pipe. More specifically, the present invention relates to a push-fit connector that includes a retaining fib on a pipe which is connected to an angled pipe section. The connection between the pipe and angled pipe section can be achieved in only one rotational position by utilizing an anti-rotation device that includes retaining arms which engage with the retaining rib when the pipe and pipe section are fitted together.

2. Discussion of the Related Art

In a known push-fit connector, which is commercially available, an anti-rotation device ensures that the angled pipe section, together with the fluid line fitted thereto, maintains a predetermined rotational position with respect to the pipe to which it is joined. It is desirable to prevent the fluid line from changing its position, which may occur due to rotation of the pipe section relative to the pipe due to external forces, to prevent the fluid fine from touching other components which might damage the fluid line. This is especially true, for example, when the fluid line is the cooling water hose in the engine compartment of a motor vehicle. However, it is often necessary to guide the fluid line, together with the pipe section fitted thereto, to the pipe from different directions in accordance with the space available for laying the fluid line. Where required, the fluid line must be bent a great deal to be able to join the pipe section to the pipe at the predetermined rotational angle. It has therefore been necessary to manufacture different molds for manufacturing pipes and pipe sections for every possible rotational angle in which the pipes and pipe section have to be joined. The anti-rotation device of these pipes and pipe section always corresponded to the respective desired relative rotational position of the pipe and pipe section. This is a very expensive manner in which to solve this problem.

SUMMARY OF THE INVENTION

It is an object of the present invention to provide a push-fit connector that permits the pipe section and the pipe to be connected in a torsion-resistance manner at different relative rotational positions.

This object is achieved in accordance with the present invention by providing a pipe section and a coupling ring which is provided with retaining arms, the coupling ring and the pipe section being prevented from relative rotation due to teeth which can engage at different rotational positions.

The coupling ring together with the pipe section are joined to the pipe in a torsion-resistant manner in a rotational position determined by an anti-rotation device. The pipe section can be joined to the coupling ring at different rotational positions depending upon which teeth of the two parts are mutually engaged. Moreover, the relative rotational position of the coupling ring and the pipe section are selected so that the fluid line can be joined to the pipe section from the desired direction without bending the fluid fine. Consequently, the same mold can be used to manufacture push-fit connectors according to the present invention for many relative rotational positions of the pipe and pipe sections.

It is preferred that the coupling ring is provided with teeth in at least one of two diametrically opposite arcs of 90°, and the pipe section is provided with at least one tooth which can engage with the teeth of the coupling ring by axially fitting together the coupling ring and the pipe section. In most applications, one arc range of 90° is sufficient to connect the coupling ring and the pipe section. Thus, only one arc of 90° of the coupling ring needs to be provided with teeth. However, when the coupling ring is provided with two diametrically opposite sets of teeth, a relative rotation of the coupling ring and the pipe section, can be achieved at a second arc range of 90°, which is disposed diametrically to the first arc range of 90°. When the coupling ring has two diametrically opposite arcs of 90° that are each provided with teeth, and the pipe section has two teeth located diametrically opposite one another with respect to the axis of rotation of the pipe section, the same total adjustment range of two diametrically opposite arc ranges of 90° can be achieved. However, by this configuration, one more moth of the coupling ring and pipe section are engaged with one another so that greater torque is transferred between the coupling ring and pipe section. When a total adjustment range of 360° is required, a second corresponding coupling ring can be configured with teeth offset by 90° with respect to the first coupling ring. Because the teeth of the second coupling ring are simply offset by 90° with respect to the first coupling ring, the mold for forming the teeth in the coupling ring is simply rotated by 90°.

The coupling ring includes an internal collar with an axially elastically expandable apron. The pipe section includes a continuous groove, into which the collar with the apron can latch when the coupling ring and pipe section are fixedly fitted together. Thus, a simple solid locking joint between the coupling ring and pipe section can be achieved merely by axially fitting together the coupling ring and the pipe section.

The fitting together of the coupling ring and pipe section is facilitated by providing the free edge of the apron with slits. These slits facilitate a radial expansion of the apron when the pipe section is inserted into the coupling ring until the band and apron latch into the groove.

An anti-rotation device is formed by stops configured on or adjacent to the axial end of the pipe for engaging with at least one of the retaining arms.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein:

FIG. 1 is a bottom view, partially broken away, of the push-fit connector according to the present invention;

FIG. 2 is a plan view, partially broken away, of the push-fit connector;

FIG. 3 is a left side view of the joint according to FIG. 2, in which a position of the pipe section, .Which is rotated by less than 90° with respect to the position shown in FIG. 2, is shown in phantom;

FIG. 4 is a sectional view taken along lines 4—4 of FIG. 5 and looking in the direction of the arrows;

FIG. 5 is a view similar to that of FIG. 1, without the pipe connection piece being illustrated;

FIG. 6 is an enlarged view of circle A of FIG. 4;

FIG. 7 is an axial side view of a coupling ring of the push-fit connector according to the present invention;

FIG. 8 is a plan view, partially broken away, of the coupling ring according to FIG. 7;

FIG. 9 is a plan view, partially broken away, of the pipe connection piece; and

FIG. 10 is a top view, partially broken away, of the pipe connection piece according to FIG. 9 in a position rotated by 90° with respect to the position illustrated in FIG. 9.

DETAILED DESCRIPTION OF THE PREFERRED EXEMPLARY EMBODIMENTS

Referring now to FIGS. 1 and 2, a push-fit connector is illustrated. The connector includes a pipe section 1, which is angled at 90°, a coupling ring 2 and a sealing ring 3. The pipe section 1 and the coupling ring 2 are preferably manufactured from thermoplastic material in a mold. The coupling ring 2 is fixedly connected to the pipe section 1. The sealing ring 3 is preferably an o-ring.

The push-fit connector joins a fluid line to a pipe 4. The fluid line can be, for example, a hose which is connected to a ribbed end section 1a of the pipe section 1. Pipe 4 can be, for example, a pipe connection piece on the radiator of a motor vehicle.

The other end section 1b of the pipe section 1 has a continuous groove 5 (see FIG. 5) to receive the sealing ring 3. End section 1b has a second groove 6 in which two diametrically opposite, radially outwardly projecting teeth 7 are configured. End section 16 also has a radially outwardly projecting collar 8 which aligns with one side wall of groove 6.

The coupling ring 2 (see FIGS. 7 and 8) has an internal collar 9. Collar 9 has an elastically expandable apron or skirt 10, which extends in an axial direction. Two slits 11 are disposed in a free end of apron 10. Slits 11 are located diametrically opposite one another and are configured to facilitate the expansion of apron 10.

The coupling ring 2 has two elastically flexible retaining arms 12. Arms 12 are formed radially outwardly of collar 9 and are provided near their distal ends with radially inwardly projecting latches or hooks 13. Arms 12 are connected to one another by an approximately oval-shaped elastically flexible ring part 14.

Teeth 15 are disposed on the radial internal side of collar 9 of the coupling ring 2. Teeth 15 are preferably disposed in two diametrically opposite arcs of 90°. Axial grooves 16 are disposed between adjacent teeth 15.

The same total number of teeth 15 and grooves 16 are disposed in each arc. The teeth 15 and grooves 16 are disposed at the same angular distance apart from one another. This angular distance is preferably approximately 9° between adjacent teeth 15 and 9° between adjacent grooves 16, respectively. In other words, adjacent teeth 15 are angularly spaced approximately 9° apart from one another and adjacent grooves 16 are angularly spaced approximately 9° apart from one another. When pipe section 1 and coupling ring 2 are fitted together, skirt 10 is latched into groove 6 of the pipe section 1. The two teeth 7 of section 1 (see FIGS. 4 and 6) respectively engage in one of the grooves 16 between the teeth 15. In the fitted together position, the pipe section 1 and the coupling ring 2 cannot be rotated with respect to one another. However, pipe section 1 and coupling ring 2 may be fitted together in a large number of rotational positions. In the illustrated embodiment pipe section 1 and coupling ring 2 can be fitted together in any one of twenty different angular positions, which angular positions range in two diametrically opposite arcs of 90°. One of the different angular positions of the pipe section 1 is shown in phantom lines in FIG. 3.

The end section of the pipe 4, which is fitted to the end section 1b of the pipe section 1, as shown in FIGS. 1 and 2, has an externally extending retaining rib 17. The latches 13 of the retaining arms 12 latch behind the retaining rib 17 when the pipe section 1b and the pipe 4 are fitted together because of the elastic flexibility of the retaining arm 12, as shown in FIG. 1. Thus, the fluid line attached to end section 1a is joined to pipe 4. The pipe section 1 and the pipe 4 can only be fitted together at a predetermined rotational position, which rotational position is determined by an anti-rotation device. The anti-rotation device includes axially extending stops 18 (see FIGS. 9 and 10) which are formed by the longitudinal edges of notches disposed in the end face of the pipe 4. The width of the notches, in the peripheral direction, corresponds to the width of the retaining arms in the peripheral direction. When the retaining arms 12 are inserted into the notches, the radial sections 19 of the retaining arms 12, adjacent to the collar 9, lie on the stops 18, as shown in FIG. 2. In the fitted position, the coupling ring 2 and the pipe section 1 cannot rotate with respect to one another.

An alternative structure for the anti-rotation device may include one or two pairs of radial projections disposed on the end face or on the external periphery of pipe 4. The projections are disposed, in the peripheral direction, at a spaced distance apart from one another, which distance corresponds to the width of the retaining arms 12. When the pipe 4 and pipe section 1 are in the fitted together position, one of the retaining arms 12 engages between the projections of a single or of two pairs of projections, respectively.

The two teeth 7 of the pipe 1 can engage with different teeth 15 or more appropriately with the grooves 16 lying between the teeth 15, so that the pipe section 1 and the coupling ring 2 can be fitted together in different relative angular positions, as shown, for example, by the position of the pipe section 1 in dashed lines in FIG. 3. Thus, it is possible to select the relative rotational positions of the pipe section 1 and the coupling ring 2 within a predetermined rotational position range in steps corresponding to the distance between the teeth. The predetermined arc range is 90° when the teeth 15 are configured in only one of the two diametrically opposite 90° arcs of the coupling ring 2, and only one tooth 7 is configured on the pipe section 1. When, on the other hand, pipe section 1 has two diametrically opposite teeth 7, as shown in FIG. 4, it is possible to step-wise select the relative rotational positions between the two parts 1 and 2 within two diametrically opposites arcs of 90°. One of the two teeth 7 of the pipe section 1 will engage in one of the grooves 16 in the one arc of 90° that has teeth 15. This same maximum adjustment range can be obtained when the teeth 15 are configured in both of the two diametrically opposite 90° arcs, and the two teeth 7 are provided, as shown in FIG. 4. Because both teeth 7 engage with teeth 15, a higher torque is transferable between the pipe 1 and coupling ring 2 in the fitted together position with this double configuration of rows of teeth 15 and teeth 7.

In illustrated embodiment a relative rotational position between the pipe section 1 and coupling ring 2 can consequently be set in a fixed manner, which is within one of the two diametrically opposite arcs of 90° and in steps corresponding to the total number of teeth 15. Thus, the fluid line can be fixed to the end section 1a of the pipe section without bending the fluid line to any notable extent because the fluid line can be connected from a number of different directions. Despite this large number of directions from which the fluid line can be connected to the end section 1a, only one mold is necessary for manufacturing the pipe section 1 and the coupling ring 2.

When it is desired to extend the arc range to 360°, a second coupling ring may be used, in which the teeth 15 are offset by 90° with respect to the teeth 15 in the first coupling ring 2. Such a second coupling ring can be manufactured in a simple manner by the same mold as used for the manufacturing of the first coupling ring 2. In the core of the mold, the portion for forming the teeth 15 and grooves 16 is simply rotated in the mold by 90° with respect to the position in which the first coupling ring 2 is manufactured.

Instead of configuring the teeth 15 on the coupling ring 2 and the teeth 7 on the pipe section 1, it is also possible to mold the teeth 15 on the pipe section 1 and the teeth 7 on the coupling ring. A further alternative includes providing teeth 15 or 7 respectively over the whole periphery of the coupling ring 2 or the pipe section 1, to obtain a relative adjustability of the coupling ring 2 and the pipe section 1 over an arc of 360°. The illustrated embodiment, however, has the advantage that, despite the many teeth, the coupling ring 2 is still relatively stiff and the manufacturing of the molds is simple because of the relatively small number of teeth.

The pipe section 1 is separated from the pipe 4 by simply compressing the oval ring part 14 radially in the direction of its longer axis until the latches 13 project over the radial external edge of the retaining rib 17. The pipe section 1 and the pipe 4 are then pulled apart from one another. To facilitate the compression of the ring part 14, an outer surface of the ring part may be knurled in two diametrically opposite areas 20.

Having described the presently preferred exemplary embodiment of a new and improved push-fit connector for joining a fluid line to a pipe, in accordance with the present invention, it is believed that other modifications, variations and changes will be suggested to those skilled in the art in view of the teachings set forth herein. It is, therefore, to be understood that all such modifications, variations, and changes are believed to fall within the scope of the present invention as defined by the appended claims.

We claim:

1. A connector for joining a fluid line to a pipe, said connector comprising:
   a pipe having an outwardly projecting retaining rib, said pipe having a first end;
   an angled pipe section having a first end section which is configured to be connected to the fluid line and a second end section which is configured to be connected to the first end of said pipe, said second end section having at least one outwardly projecting tooth; and
   a coupling ring being fixedly connected to said angled pipe section at any one of a predetermined number of relative rotational positions, said coupling ring having a at least two inwardly projecting teeth and a pair of outwardly projecting retaining arms, said at least two inwardly projecting teeth engaging with said at least one outwardly projecting tooth to prevent said coupling ring and said angled pipe section from rotating with respect to each other, said retaining arms being engaged with said retaining rib, said first end of said pipe having an anti-rotation means for preventing rotation of said coupling ring with respect to said pipe.

2. A connector according to claim 1, wherein the coupling ring is provided with said at least two inwardly projecting teeth in at least one of two diametrically opposite arcs of 90° and the at least one tooth of the pipe section engages with the at least two teeth of the coupling ring by axially fitting together the coupling ring and the pipe section.

3. A connector according to claim 2, wherein the coupling ring has an internal collar with an axially elastically expandable apron and the pipe section has a continuous groove into which the collar with the apron latches when the coupling ring and pipe section are fitted together.

4. A connector according to claim 3, wherein the apron has a free edge which has at least two slits.

5. A connector according to claim 4, wherein said anti-rotation means is formed by a plurality of stops disposed on the first end of the pipe for receiving at least one of the retaining arms.

6. A connector according to claim 1, wherein said at least two inwardly projecting teeth of said coupling ring comprises a plurality of teeth disposed over the whole periphery of the coupling ring over an arc of 360°.

* * * * *

UNITED STATES PATENT AND TRADEMARK OFFICE
CERTIFICATE OF CORRECTION

PATENT NO. : 5,586,791
DATED : December 24, 1996
INVENTOR(S) : Hary KIRCHNER et al.

It is certified that error appears in the above-indentified patent and that said Letters Patent is hereby corrected as shown below:

On title page, [30], Foreign Application Priority Data, change "44 29 498.0" to --P 44 29 498.0--.

Signed and Sealed this

Twenty-second Day of April, 1997

Attest:

BRUCE LEHMAN

*Commissioner of Patents and Trademarks*

*Attesting Officer*

UNITED STATES PATENT AND TRADEMARK OFFICE
CERTIFICATE OF CORRECTION

PATENT NO. : 5,586,791
DATED : December 24, 1996
INVENTOR(S) : Hary Kirchner, et al It is certified that error appears in the above-indentified patent and that said Letters Patent is hereby corrected as shown below:

IN THE CLAIMS:

Claim 1, column 6, line 14, delete "a", first occurrence; change "two" to --one--; and change "teeth" to --tooth--;

line 15, change "two" to --one--;
line 16, change "teeth" to --tooth--;
line 22, following "pipe", insert --; wherein one of second end section and said coupling ring having at least two projecting teeth--.

Claim 2, column 6, line 24, change "two" to --one--;
line 25, change "teeth" to --tooth--;
line 27, change "two teeth" to --one tooth--.

UNITED STATES PATENT AND TRADEMARK OFFICE
CERTIFICATE OF CORRECTION

PATENT NO. : 5,586,791
DATED : December 24, 1996
INVENTOR(S) : Hary Kirchner, et al It is certified that error appears in the above-indentified patent and that said Letters Patent is hereby corrected as shown below:

IN THE CLAIMS: (Continued)
Claim 6, column 6, line 41, change "two" to --one--; and change "teeth" to --tooth--.

Signed and Sealed this

Fourteenth Day of October, 1997

*Attest:*

BRUCE LEHMAN

*Attesting Officer*     *Commissioner of Patents and Trademarks*